United States Patent [19]
Richardson et al.

[11] 3,864,258
[45] Feb. 4, 1975

[54] APPARATUS FOR TREATING SEWAGE

[75] Inventors: John M. Richardson, Key Largo, Fla.; George W. Reid, Norman, Okla.

[73] Assignee: RSC Industries, Inc., Opa-Locka, Fla.

[22] Filed: Mar. 26, 1973

[21] Appl. No.: 344,766

[52] U.S. Cl. ............... 210/85, 4/10, 110/8 R, 110/15, 210/149, 210/179, 210/186, 210/196, 210/396
[51] Int. Cl. ............... B01d 33/14, C02b 3/04
[58] Field of Search ............ 110/8 R, 15; 210/8, 62, 210/64, 66–68, 71, 77, 85, 86, 152, 175, 179, 210/181, 184, 186, 196, 391, 396, 408, 526, 210/149; 4/10, 115

[56] References Cited
UNITED STATES PATENTS

| | | | |
|---|---|---|---|
| 1,788,790 | 1/1931 | Booth | 210/64 X |
| 3,486,621 | 12/1969 | Hirs | 210/68 |
| 3,559,807 | 2/1971 | Reilly | 210/68 |
| 3,642,135 | 2/1972 | Borden | 210/64 X |
| 3,655,048 | 4/1972 | Pergola | 210/67 |
| 3,668,077 | 6/1972 | Ban | 110/15 X |
| 3,673,614 | 7/1972 | Claunch | 210/152 X |
| 3,679,053 | 7/1972 | Koulovatos et al. | 210/86 |
| 3,733,617 | 5/1973 | Bennett | 210/152 X |
| 3,762,554 | 10/1973 | Wallover | 210/179 |

*Primary Examiner*—Charles N. Hart
*Assistant Examiner*—Robert H. Spitzer
*Attorney, Agent, or Firm*—Dressler, Goldsmith, Clement & Gordon, Ltd.

[57] ABSTRACT

Apparatus for disposal of human waste received from toilets and other like disposable waste products with particular utility in passenger carrying vehicles such as waterborne vessels. The method of the apparatus of the invention involves the steps of passing a waste material, such as sewage, immediately upon generation, from a toilet to a filtration area, separating the sewage, primarily fecal solids and paper solids present in an aqueous medium by deposit on a moving porous medium through which the aqueous medium passes to a filtered liquid accumulator, moving said porous medium to carry the deposited solids through a thermal destructor chamber wherein the viable material is destroyed and solids are converted to inert ashes and separately discharging inert ash and gases produced in said thermal destructor chamber.

By proper design of the porous media a given amount of liquid can also be carried to the thermal destructive zone wherein it will be thermally destroyed permitting a balance to be obtained in the reservoir. Additions of make up water can be by level control as well.

4 Claims, 2 Drawing Figures

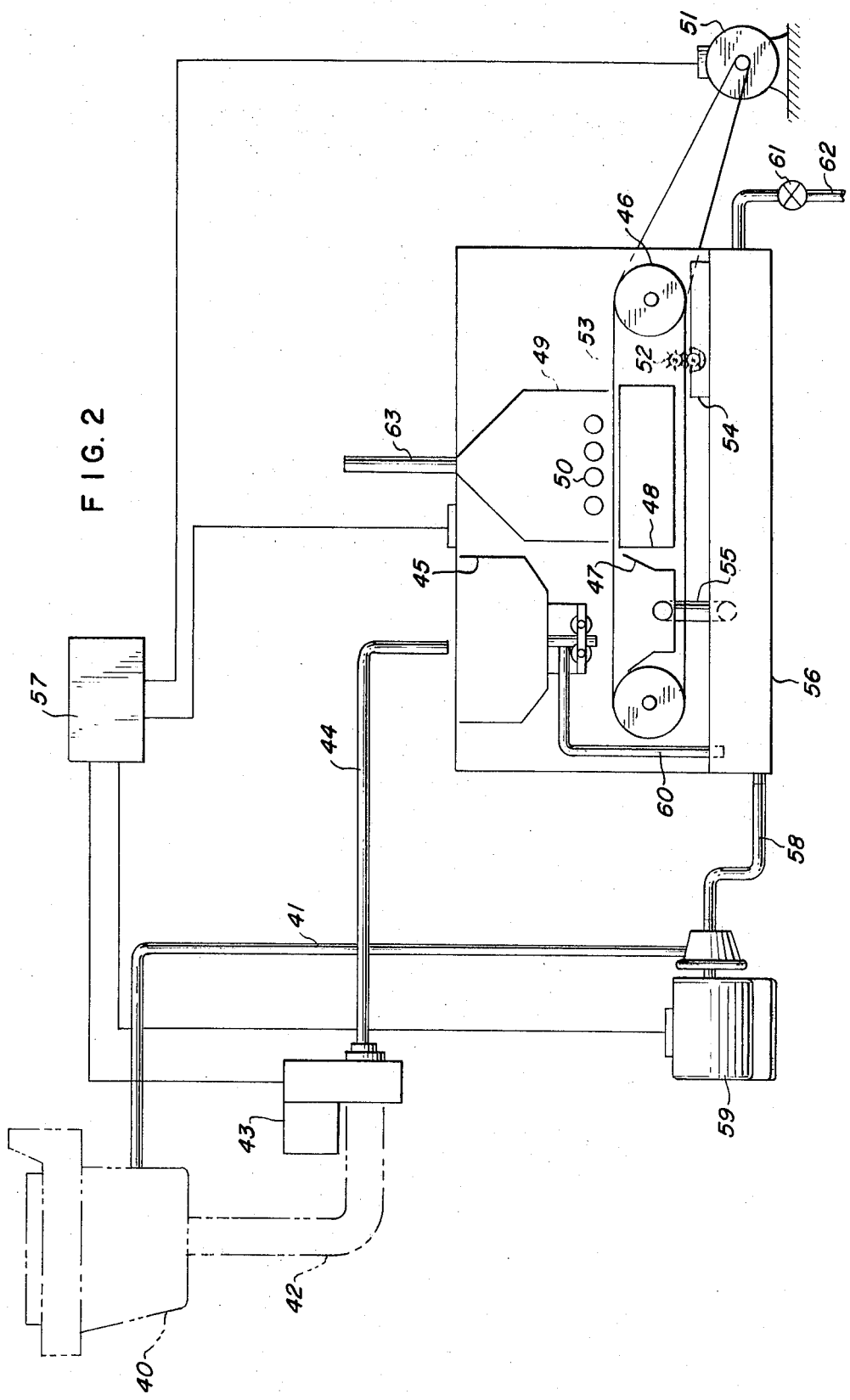

APPARATUS FOR TREATING SEWAGE

BACKGROUND OF THE INVENTION

This invention relates to the treatment of waste material. More particularly, it relates to apparatus for processing of sewage. Still more particularly, it relates to a simplified apparatus for treatment of sewage particularly adaptable to disposal of human waste and/or other like disposable waste products for waterborne vessel usages, or various other types of vehicles and/or structures that have a total volume of flow which is relatively small.

In existing waste disposal systems especially designed for use in passenger carrying vehicles, such as motor homes, house trailers and waterborne vessels, disposal of waste products has not been entirely satisfactory because some systems discharge waste overboard without treatment of any kind. Others merely accumulate the waste material and therefore the systems have a limited capacity and period of use and as a consequence the vehicles are limited for their purpose. In other systems involving sterilizing of aqueous suspensions produced by comminution of waste liquid including sludge forming materials, heating the suspension requires large heat exchange areas. To accomplish combustion to a high degree of completeness requires prolonged treatment at a high temperature. The disadvantage of such systems is the cost of maintaining the high temperature required to avoid production of malodorous and/or otherwise noxious gaseous and solid products.

Still another limiting factor in the use of presently available disposal systems is that they must function as a completely self-contained unit to prevent discharge of odors into the atmosphere or harmful materials into public bodies of water, due to laws established to require waste disposal systems to function without discharging any harmful waste products into the local environment.

SUMMARY OF THE INVENTION

In accordance with the present invention, there is provided a simplified but highly efficient system providing elimination of viable organisms with a heat requirement of only of the order of 1/8 to 1/10 that required for treatment of comminuted sewage suspensions to meet rigid waste water quality control standards.

Briefly, the process of using the apparatus of this invention comprises separating the sewage solids present in an aqueous medium immediately on generation, avoiding the inclusion of liquid with solids, which is costly to treat, by accumulation as a layer on a movable porous medium through which the aqueous medium passes to a filtered liquid accumulation reservoir, then transporting the accumulated sewage solids through a thermal destruction chamber wherein said solids are converted to inert ashes and gases, discharging gases produced in said thermal destruction chamber at temperatures sufficient to destroy odors and withdrawing accumulated inert ash solids from said chamber separately from the discharge gases.

An apparatus for treating sewage comprises a moving porous element, a filtered liquid accumulator tank positioned below a limited area of said porous element, means for delivering sewage solids present in an aqueous medium to said limited area of said porous element present above said accumulator reservoir, means for the thermal destruction of the solids by radiant heat, means for actuating said moving porous element to carry solids accumulated on said porous element at least partially through said thermal destructor and means for withdrawing inert ash produced by solids thermally destroyed from said thermal destructor separately from vented gases.

Another feature of the invention is the provision of simplified and improved means of effecting self cleaning of the porous media by passage through the thermal destructor, thereby eliminating frequent servicing. In this apparatus, the separation of sewage solids received from the usual water closet is effected by separation. The flush waste is directed to an area above a sump, where separation of liquids and solids is achieved by means of a porous media carrying the solids and a controlled amount of liquid to the thermal destructor while permitting filtered liquids to pass through to the reservoir. The porous media moves at a rate through the thermal destructor sufficient to allow all wastes to be thermally destroyed.

An example of a suitable material for the moving porous media is a heat resistant, finely woven wire mesh. Effectiveness of such a porous media depends on the size of the pores in the media. As the liquids of the flush waste pass through the porous media, particles larger than the openings remain on the surface of the medium and are carried to the thermal destructor.

Liquids accumulated in said reservoir, because of immediate separation, are rendered returnable as a sanitary flushing fluid to the toilet by chemically and/or physically stabilizing such by introduction of a bactericidal agent which generally is added in the form of halogen-containing solutions, for example, aqueous alkali metal hypochlorite solids such as sodium hypochlorite and solutions having calcium hypochlorite, permanganates, chelates, quateries, etc., as solutes. If desired, a portion of the filtered liquid can be passed into an evaporation zone of the thermal destructor and converted into odorless, non-polluting vapors.

Solid deposition on the porous media is accomplished by mechanical means such as a doctor blade, roller or other mechanical means of distribution capable of regulating the volume of solids on the porous media.

The thermal destructor may be maintained at any appropriate level of pressure, for example, by an exhaust blower. In the thermal destructor, generally held under sub-atmospheric pressure, radiant heat is supplied, for example, by quartz heaters to maintain an internal gas temperature in the range between about 900° and 1,800°F. At such temperatures, any moisture content of the solids is converted to vapors at temperatures in excess of the saturation temperature and the solids become dry solids subject to heat decomposition or high temperature oxidation to produce inert ash solids and gases.

Gases and vapors formed in the thermal destructive chamber may move directly out of the chamber without cooling in response to the suction created by an exhaust blower or induced pressure.

Solids are reduced to a fine ash in the thermal destructor chamber and are carried forward on the porous medium to be deposited in an ash receptacle when the medium reverses direction and if desired the porous medium may be further brushed or vibrated off.

In one embodiment of the invention, the apparatus also includes a closed system with means for automatically maintaining a predetermined amount of liquid in the system.

The particular method forming a portion of this invention can be practiced by the preferred embodiments illustrated herein, as well as other embodiments that fall within the scope of the claims directed to the novel method. The particular apparatus disclosed herein is also novel and will be understood by referring to the following drawings, wherein:

FIG. 1 is a vertical sectional view of a sewage treatment apparatus with certain parts illustrated schematically; and FIG. 2 is a diagrammatic sectional view illustrating a modification of a portion of the apparatus illustrated in FIG. 1.

DETAILED DESCRIPTION

Figure 1:
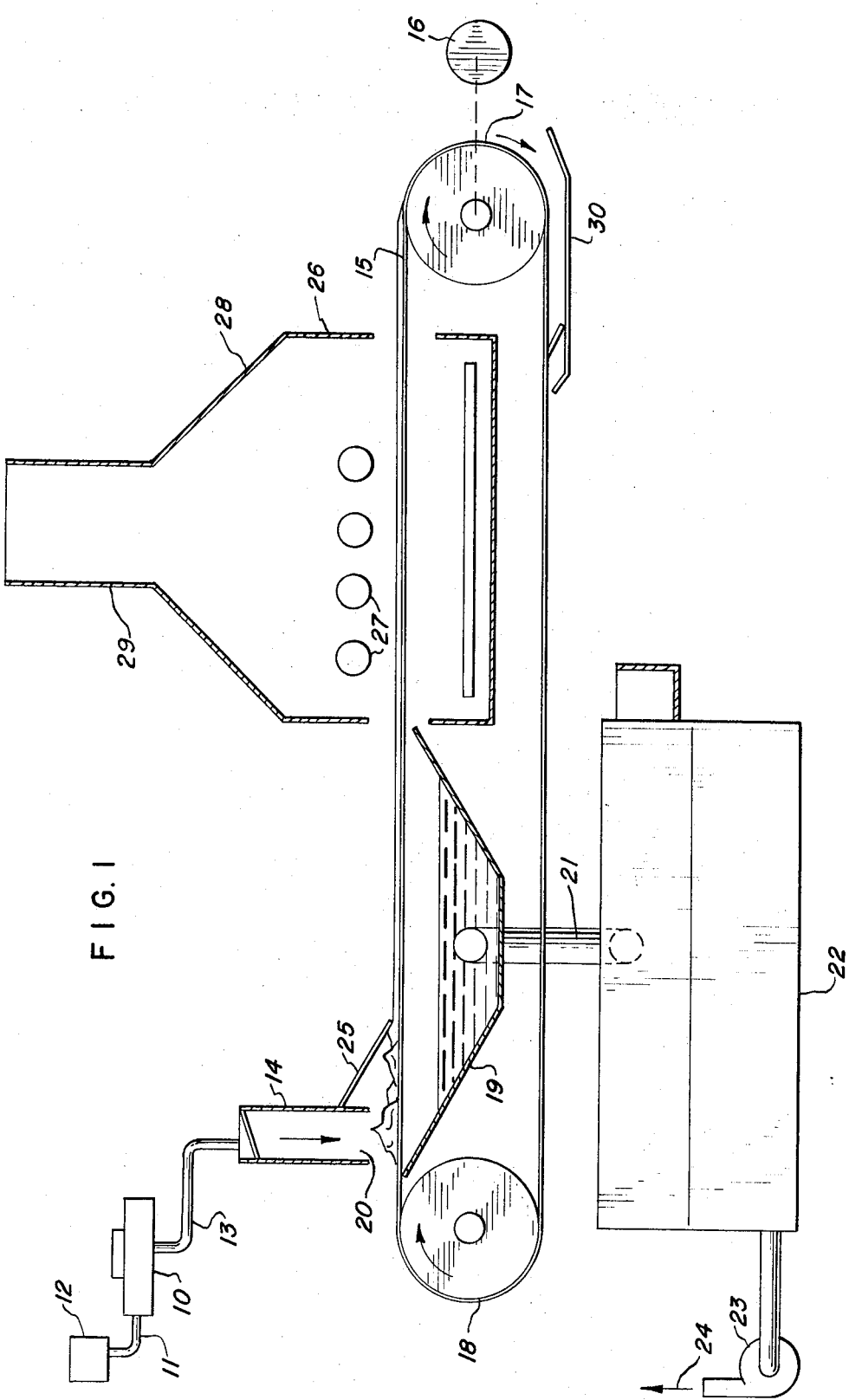

Referring first to FIG. 1, the numeral 10 indicates a conventional marine toilet disposed to receive human waste products therein. Water is introduced into said toilet through inlet pipe 11 from flush tank 12 to flush the contents of the toilet out through outlet pipe 13. Outlet pipe 13 delivers the waste material to trap 14 which controls waste material flow to a limited outlet area and is positioned above the upper surface of the moving porous media 15. Porous media 15 is power driven by motor means 16 around drums 17 and 18. Porous media 15 has an upper horizontal travel located below the outlet of trap 14. A liquid sump 19 is positioned below the upper travel of porous media 15 and below the outlet 20 of trap 14. From the liquid sump 19, the liquid flows through pipe 21 to a reservoir 22 where the filtered liquids are disinfected by the usual means. Disinfected or sterilized liquid is drawn from reservoir 22 by pump 23 and returned to flush tank 12 through line 24.

Solid deposition on the porous media 15 is accomplished by mechanical means such as a doctor blade 25, roller or other mechanical means of distribution capable of regulating the volume of solids on the porous media 15. Porous media 15 moving horizontally on the order of, but not limited to ½ to 2 inches per minute carries the solids into a thermal destructor chamber 26. Thermal destructor chamber 26 is provided with suitable means 27 such as quartz tubes for creating radiant heat. The radiant heat will serve to evaporate moisture present in the solids and thermally destroy the solids to ash. Vapors and gaseous products from the drying and thermally destroyed at temperatures in the range of 900° to 1,800°F. will rise in the thermal destructor 26 which is constricted at 28 toward its upper end to communicate with an exhaust 29. The gases are discharged through exhaust 29 to the atmosphere. Ash remaining from the thermally destroyed solids are carried forward by the continuing movement of the porous media 15 out of the thermal destructor chamber 26 to be discharged into clean out pan 30 at the reversal of direction of porous media 15 around drum 17.

In FIG. 2 of the drawings, there is illustrated a waste disposal system which is a modification of the invention wherein thermal treatment of the liquid separated from finely divided material may be carried out and in which the amount of liquid in a closed system may automatically be maintained at a predetermined level. The illustrated system can be insulated and containerized into a compact low external temperature unit.

In FIG. 2, the numeral 40 indicates a conventional toilet. Water is introduced into said toilet through pipe 41 to flush the waste and toilet paper out through outlet pipe 42.

Outlet pipe 42 delivers the waste to a macerator or comminuting means 43. The aqueous medium of communited waste is withdrawn from macerator or comminutor 43 through pipe 44 and deposited in distributor 45, whereby the aqueous medium is distributed to the porous medium 53. The aqueous medium of comminuted solids is directed to a limited area on the upper surface of the moving porous media 53. Endless porous media 53 is driven by motor means 51. Belt or porous media 53 has its horizontal upper travel located below the outlet of distributor 45 and above a liquid sump 47. Liquid drains through porous media 53 into sump 47 and flows through conduit 55 to liquid reservoir 56 while the sewage solids, which are larger than the pore size of the porous media, are collected on the moving media 53.

Solids deposited on porous media 53 are transported to thermal destructor chamber 49. Thermal destructor chamber 49 is provided with suitable means 50 for creating radiant heat such as quartz lamps with or without parabolic reflectors adjacent thereto. Thermally protected controls can be provided within chamber 49 for maintaining an appropriate temperature therein, as well as means for indicating the malfunction of the controls. Solids thermally destroyed in the thermal destructor chamber are reduced to ash. Ashes are carried on the surface of the porous media 53 until it reverses its direction of movement around drum 46 at which time they fall into clean out pan 54. Some fine ashes may pass through porous media 53 before its direction of movement is reversed and are collected in clean out pan 48. Any ashes adhering to the porous media after its direction is reversed are cleared by brushes 52, or other suitable means.

The filtered liquid accumulated in liquid reservoir 56 may be substantially maintained at a certain level through means that will now be described. Excess liquid in reservoir 56 is continuously withdrawn through conduit 60 by distributor 45 as long as level remains above the inlet of conduit 60. Excess liquids delivered to distributor 45 are distributed to porous media 53. By design, a portion of the liquids will remain on porous media 53 to be carried to thermal destructor chamber 49 for thermal destruction. Control switch 57, upon demand, directs the pumped liquid back to flush the toilet 40 from reservoir 56 via conduit 58, pump 59 and through conduit 41. If the liquid level in reservoir 56 is low, makeup water will be added by level control 61 through pipe 62 from a source (not shown).

Gases in the form of odorless non-polluting vapors consisting of decomposition products of solids produced by processing with an appropriate time versus temperature relationship, rise through exhasut 63 and are discharged into the atmosphere.

While the invention is not limited to any size or volume of flow, a specific example will be set forth.

When human sewage of a volume of 13 cubic inches and a 50 percent moisture content is transferred in a volume of approximately ¼ to ½ gallon of flush water, the flush waste is deposited on a porous media, through which the liquid drains into sump 19. With a 100 mesh porous media, the waste solids would be comminuted to a size of about 150 microns. As the solids move below doctor blade 25, the waste is flattened into a layer over the width of the porous media to the desired thickness. The porous media moving at a rate of 1 inch per minute moves the solids through a 10 inch long thermal destructor chamber in 10 minutes. The 13 cubic inches of waste requires a latent heat of moisture for 100 cc. of water of 200 btu (60 watt/hrs.). For 55 grams/person/day of waste, the energy requirement to be provided by 4-500 watt units during the 10 minutes of solids movement through the thermal destructor chamber is 360 watt/hours. If the excess liquid would not have been removed prior to passage through the thermal destructor chamber, the flush waste would have had an energy requirement of 3,000 watt/hours.

The liquid that is accumulated in reservoir 22 (16.68 lbs.) has mixed therein 10 percent to 15 percent by weight of a bactericidal agent of 79 grams of calcium hypochlorite to destroy bacteria and to oxidize the urine. The sterilized water is then returned to flush tank 12.

Obviously, various modifications and additions may be made to the apparatus of the present invention depending upon the sources of waste.

We claim:

1. A self contained, non-contaminating waste disposal system, comprising a toilet for waste matter, a macerator pump receiving sid waste matter, conduit means to said macerator pump for conveying comminuted waste produced and terminating in a distributor means, a movable endless and porous belt below said distributor means for separating solids and liquids of controlled particle size, a sump for receiving said separated liquids, a thermal destruction chamber directly adjacent to said distributor means, said porous belt extending through said destruction chamber, means for moving said porous belt to carry said solids through said thermal destruction chamber, means for heating said thermal destruction chamber by radiant heat for subjecting said solids to high temperature oxidation at temperatures in the range of 900° to 1,800°F. to convert said solids to an inert ash in the thermal destruction chamber, means for exhausting thermally destructed gases from said thermal destruction chamber externally to the atmosphere, means for removing said ash from the thermal destruction chamber to an external receptacle, means for cleaning said porous belt, reservoir means for receiving said separated liquid from said sump, means for evaporating excess liquid, means for disinfecting said separated liquids, means for recycling separated liquid from the reservoir means for flushing the toilet, means for controlling the level in said reservoir means, and means for adding makeup water to said reservoir means.

2. The waste disposal system in accordance with claim 1 further including means insulating and containerizing the system into one compact low external temperature unit.

3. The waste disposal system in accordance with claim 1 wherein thermally protected control means are provided in said thermal destruction chamber for maintaining an appropriate temperature therein.

4. The waste disposal system in accordance with claim 3 wherein said thermally protected control means are provided with means for indicating any malfunction in said control means.

* * * * *